United States Patent [19]

Kuo

[11] Patent Number: 4,887,792
[45] Date of Patent: Dec. 19, 1989

[54] STOP-CHECK VALVE

[76] Inventor: Ping-Song Kuo, No. 82, Tung Cheng Street, Tainan, Taiwan

[21] Appl. No.: 254,364

[22] Filed: Oct. 6, 1988

[51] Int. Cl.⁴ .............................................. F16K 31/44
[52] U.S. Cl. ...................................... 251/82; 251/187; 251/203
[58] Field of Search .................. 251/82, 203, 187, 266

[56] References Cited

U.S. PATENT DOCUMENTS 1,645,785 10/1927 Wilson ................................ 251/203
2,999,666 9/1961 Sjogren ................................ 251/82
3,334,858 8/1967 Hay ....................................... 251/82

Primary Examiner—A. Michael Chambers
Attorney, Agent, or Firm—Richard Bushnell

[57] ABSTRACT

A stop-check valve includes inside a valve body a swing check valve disc and a contacting projection. A vertically mounted valve rod provided with a handwheel and having at the lower end a structure of a cylindrical contact portion is further included. The contact portion is vertically movable in coupling arrangement with the valve rod and capable of contacting with the contacting projection on the valve disc.

4 Claims, 2 Drawing Sheets

STOP-CHECK VALVE

BACKGROUND OF THE INVENTION

The present invention relates to a stop-check valve for regulating the passage and the amount of flow of a fluid in the piping systems or machinery.

Swing check valves and gate valves are known to be the valves of frequent use in pipes, tubes and other forms of passageway, in which the check valves open and close the seats by their swingeable discs to prevent the return flow of fluids. These valves not only are simple in construction and can effectively check, but because there is least change in the direction of the passageway of the flow in and outside of their valve body and also there is possibility for the flow in whole amount during full opening, the check valves can minimize resistance to the fluid and thus possess the efficiency in facilitating particularly the passage of fluid as is in the gate valves. Such a check valve, however, does not have the construction and function capable of opening and closing for controlling the fluid and regulating the flow of the gate valves and the usual stop valves. The check valves are thus restricted in uses and for this reason, it is frequently required that a stop valve be fitted during the design of passageways in order to open and close and regulate the fluids, and hence an increase in expenses for equipment and fitting. Such a drawback requires thus the attention for an improvement and solution.

SUMMARY AND OBJECT OF THE INVENTION

The aim of the present invention is to solve the above-mentioned problem. With this aim in view, according to the present invention, there is provided a stop-check valve of a novel construction, including a contacting projection on the top of a valve disc constituting a swing check valve, a stem and a handwheel arranged vertically on the upper side of the valve disc and a contact portion capable of moving linkingly up and down and located at the lower end of the stem such a construction not only retaining its non-return function but also capable of vertically moving the contact portion linked to the lower end of the valve rod by operation of the handwheel and through change of the position by the contact relation between the contact portion and the contacting projection on the valve disc whereby it further enables control of the closing and opening of the valve disc and the degree of opening, such that the valve of the present invention has the dual functions of a check valve and a stop valve, and also functions with the least change in flow direction and in the passage of full flow amount as a gate valve.

The foregoing object and advantages of the present invention will be further appreciated from a consideration of the following detailed description and accompanying drawings.

DETAILED DESCRIPTION OF THE INVENTION

Figure 1:
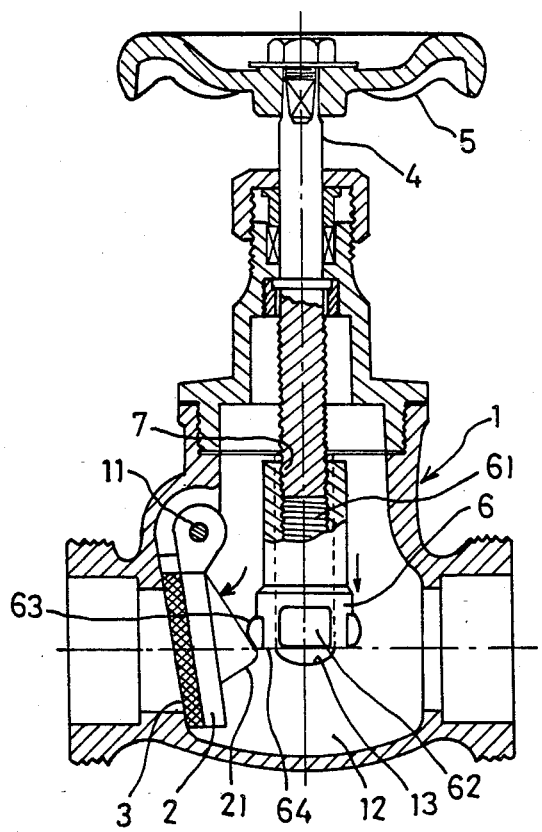
FIG. 1 is a longitudinal section in front view of a stop-check valve of the present invention in closed condition.

There is shown in the drawing a stop-check valve of the present invention, comprising, essentially, a valve body 1, a swing check valve disc 2 mounted on the body 1, a valve seat 3, a stem or valve rod 4, a handwheel 5 and a contact portion 6 located at the lower end of the valve rod 4.

Referring now in more detail to the drawing, the disc 2 and seat 3 of the swing check valve are of a construction of a usual type, in which the valve disc 2 is pivotable through the pivot shaft 11 and thus constitutes a function of checking return flow of a fluid. However, in the swing check valve disc 2 of the present invention, there is formed integrally at the top near the center thereof a contacting projection 21, the function of which will be described later.

On the upper side of the valve disc 2 there is suspended the valve rod 4 for control use and the handwheel 5; since arrangement of the valve rod 4 and handwheel 5 is a known construction, it will not be dealt with in detail here. However, in the embodiment of the invention there is attached by means of a threaded structure 7 at the lower end of the said valve rod 4 a vertically movable contact portion 6.

This contact portion 6 forms a cylinder having in the interior a threaded, vertically through hole 61 and at the opposite sides of the lower end of the contact portion 6 is formed a pair of transversely projecting rod like guide protuberances 62. This pair of guide protuberances 62 is slidably engaged in a pair of corresponding vertical guide grooves 13 defined on the inside wall of the valve chamber 12 of the valve body 1. Furthermore, in the contact portion 6 at least the side face of the lower end of the cylinder, which faces the check valve disc 2 and is formed with an edge to facilitate contact with the contacting projection 21 on the valve disc 2, is a curved contact boss 63. This contact boss 63, however, is not a prerequisite, it will also work if the lower end of the cylinder of contact portion 6 is directly used for the contact purpose. The provision of the contact boss 63 will nevertheless be more desirable since this can work more smoothly during contacting. On the other hand, in the present embodiment on the side face of the contact portion 6 symmetrical to the contact boss 63 there is also formed a contact boss 63 such that no attention will be required as to the direction during assembling and further when one side is being worn out it can be changed to the other side.

Following the foregoing arrangement, the contact portion 6 is vertically movable by way of the rotation of the valve rod 4 and at the guidance of the guide groove 13, and is also able to make timely contact with the projection 21 through the contact boss 63 and the bottom 64 of the cylinder to bear against the valve disc 2.

Figure 2:
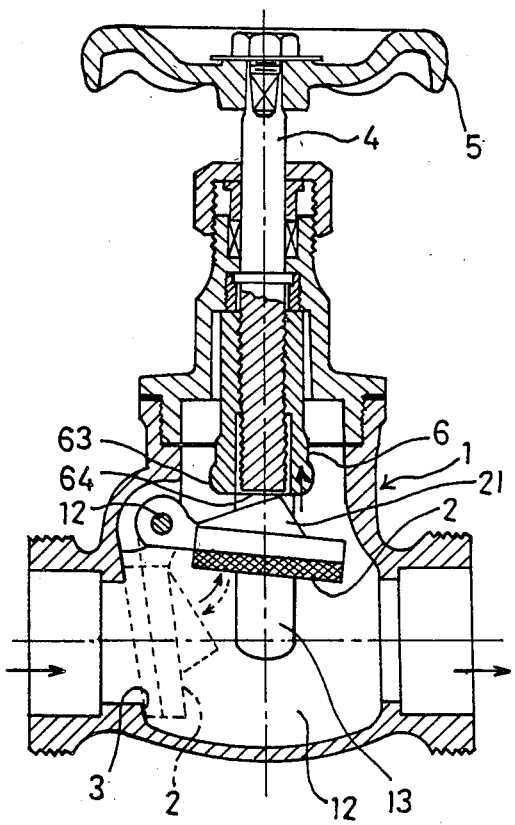
FIG. 2 is a vertical section in front view of the stop-check valve in fully open condition.
Figure 3:
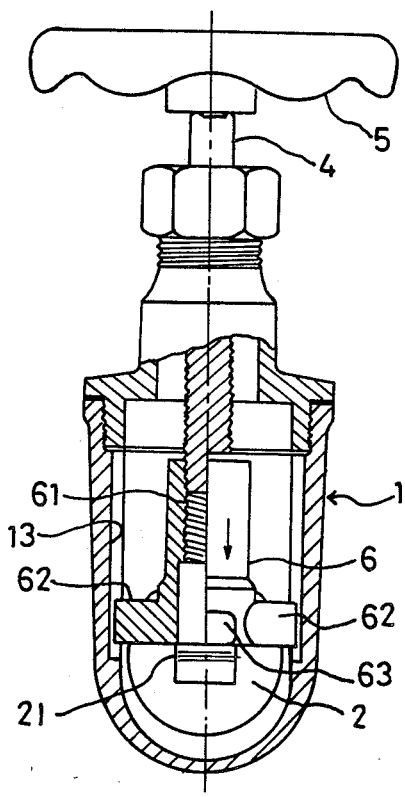
FIG. 3 is a vertical section in side view of the major part of the stop-check valve in closed condition.

In the following, an account on the working condition of the stop-check valve constructed as above according to the present invention is given. In the closure of valve of the invention as depicted in FIGS. 1 and 2, the contact portion 6 thereof falls to the lowest in position and the contact boss 63 presses against the upper surface of the contacting projection 21 on the check valve disc 2 forcing the check valve disc 2 to bear against the valve seat 3 in order to close the valve. At this time, being supported in the guide grooves 13 on the valve body 1 the guide protuberances 62 on the contact portion 6 will not slant around and deviate away from the central position. Even if the valve disc 2 is under pressure action from the inlet side fluid, this contact portion 6 due to pressure will still not slant around, deviate away or force the valve rod 4 to deform. As such, the contact portion 6 is able to perform contact action in a firm and smooth way no matter in whichever position it is in contact with the valve disc 2, thus accomplishing the effective opening and closing of the valve or stabilizing the degree of opening.

Next, when the handwheel 5 is turned round thereby raising the contact portion 6 at the lower end of the valve rod 4 through the coupling action of valve rod 4 (refer to FIGS. 2 and 4), it is readily possible to open out the valve disc 2. Depending on the upwardly raised position of the contact portion 6, it is possible to accomplish regulation of the degree of opening, that is, depending upon the contact relation between the contact boss 63 and the lower end face 64 of the contact portion 6 and the contacting projection 21 on the valve disc 2 and the change in position, degree of the opening can thus be regulated. When fluid pressure on the inlet side is smaller than that on the outlet side, the check valve disc 2 will close the valve and stop the return fluid. It can thus be appreciated that a valve of the present invention not only possesses a function of a check valve, but has also been bestowed with the opening and closing, and the regulating functions of a usual stop valve.

Figure 4:
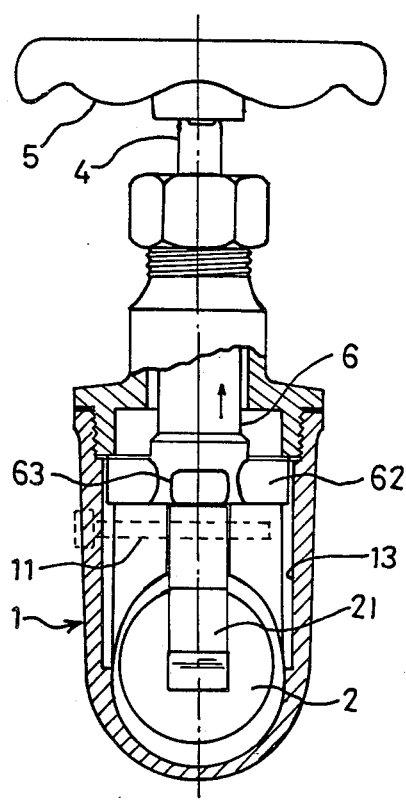
FIG. 4 is a vertical section in side view of the major part of the stop-check valve in condition where the contact portion is in the up-moving condition.

Now, returning to FIGS. 2 and 4 again, the actual lines show that the valve of the present invention is in the fully open condition when the contact portion 6 is raised up to the uppermost position. When fluid passes through, the swing check valve disc 2 is rotated from a closed position as shown in FIG. 4 to the above to be in the fully open position as depicted in FIG. 2. Except that the valve disc 2 whose contacting projection 21 is contacting the lower end face 64 of the contact portion 6 is completely open, this valve when completely open will allow fluid to pass through in full amount. Hence, the valve of the invention possesses also a full-flow function of a gate valve.

Owing to the contacting projection 21 on the swing check valve disc 21 and the structure of the contact portion 6 which is vertically movable in a coupling action via the valve rod 4, the stop-check valve constructed according to the present invention is capable of controlling the opening and opening of the check valve disc 2 and regulating of the degree of opening by the operation of the handwheel 5. As a result of this function, the valve not only possesses a function of checking return flow in a check valve, but is also possessive of the function of opening and closing as well as regulating the degree of opening in a usual stop valve. Furthermore, when the valve is fully open, it also has a function of circulation in full amount as a gate valve. Hence, the valve of the invention is able to attain the effectiveness as a single valve for triple uses, and since fitting of a separate check valve and a stop valve including a gate valve in a pipeline can be avoided, this simplifies construction in the pipeline and cuts expenses in equipments and the fitting. Accordingly, the stop-check valve of the present invention is novel in construction and is of a practically useful article.

What is claim is:

1. A stop-check valve, comprising a valve body, a swing-type check valve disc mounted in said body and having an inlet side and an outlet side, a contacting projection formed on said outlet side of said valve disc, a rotatable and axially fixed valve rod positioned in said body generally perpendicular to a flow path of fluid through said valve, one end of said valve rod having an axially fixed handwheel attached thereto, another end of said valve rod being threaded and positioned proximate said outlet side of said valve disc, and a contact portion threadedly coupled with said threaded end of said rod, and interengaging means on said valve body and said contact portion for preventing rotation of said contact portion, and said contact portion being axially movable along said rod upon rotation of said rod for operatively engaging said contacting projection.

2. A stop-check valve according to claim 1, wherein said contact portion has a vertically oriented threaded hole which is threadedly engaged by a threaded portion of said valve rod for threadedly axially moving said contact portion along said valve rod such that said axial movement of said contacting portion along said threaded portion of said valve rod regulated the degree of opening of said valve disc relative a valve seat.

3. A stop-check valve according to claim 2, wherein said contact portion has formed on the side facing said check valve disc on the lower end of the cylinder an edge of a curved contact boss to facilitate contacting.

4. A stop-check valve according to claim 1, wherein said contact portion comprises a cylinder, said interengaging means comprising a pair of rod-like guide protuberances on two sides of said cylinder respectively slidably mounted between opposed guide surfaces of a pair of guide grooves defined on the inside wall of said valve body.

* * * * *